US00RE34922E

United States Patent [19]

Hattori et al.

[11] E Patent Number: Re. 34,922

[45] Reissued Date of Patent: May 2, 1995

[54] WATERCRAFT

[75] Inventors: Toshiyuki Hattori; Fumuhiko Ebihara, both of Iwata, Japan

[73] Assignee: Yamaha Hatsudoki Kabushiki Kaisha, Iwata, Japan

[21] Appl. No.: 206,714

[22] Filed: Mar. 7, 1994

Related U.S. Patent Documents

Reissue of:

[64] Patent No.: 5,255,626
Issued: Oct. 26, 1993
Appl. No.: 786,536
Filed: Nov. 1, 1991

[30] Foreign Application Priority Data

Oct. 9, 1991 [JP] Japan ..... 3-262355

[51] Int. Cl.[6] ..... B63B 1/20

[52] U.S. Cl. ..... 114/270; 114/290; 114/362; 114/363

[58] Field of Search ..... 114/290, 357, 362, 363, 114/270, 56

[56] References Cited

U.S. PATENT DOCUMENTS

| | | | |
|---|---|---|---|
| 3,158,129 | 11/1964 | Mauer | 114/270 |
| 3,397,670 | 8/1968 | Bedford | 114/270 |
| 4,760,810 | 8/1988 | Kobayashi | 114/56 |
| 4,893,579 | 1/1990 | Kobayashi | 114/363 |

FOREIGN PATENT DOCUMENTS

| | | | |
|---|---|---|---|
| 61-291292 | 12/1986 | Japan | 114/270 |
| 62-125989 | 6/1987 | Japan | 114/362 |
| 0285090 | 3/1990 | Japan | 114/290 |

*Primary Examiner*—Sherman Basinger
*Attorney, Agent, or Firm*—Knobbe, Martens, Olson & Bear

[57] ABSTRACT

A small watercraft adapted to seat one or more riders in motorcycle fashion and which has a hull configured so as to facilitate leaning without capsizing. The foot area for the riders is such that a rider may either sit on the seat in straddle fashion or stand behind the seat and may move between these positions easily and while the watercraft is in motion.

5 Claims, 7 Drawing Sheets

WATERCRAFT

Matter enclosed in heavy brackets [ ] appears in the original patent but forms no part of this reissue specification; matter printed in italics indicates the additions made by reissue.

BACKGROUND OF THE INVENTION

This invention relates to a watercraft and more particularly to an improved sporting type of watercraft which is also capable of utilitarian use.

There are a wide variety of propelled type of watercraft each of which is designed primarily for a single purpose. Recently there has been a large variety of jet propelled type of small watercraft proposed that also are designed primarily for different purposes. One of these types of watercraft is primarily sporting in nature and is designed so as to be operated by the rider standing on the watercraft. Other types of watercraft try to emulate this sporting characteristic but are more utilitarian in nature and the rider operates the watercraft seated in a straddle fashion.

There also have been proposed types of watercraft which are similar to motorcycles and operate on floats or skis. However, by their very nature these watercraft, although they resemble a motorcycle, are not ridden like a motorcycle. That is, this type of watercraft does not permit the operator to control the motion of the watercraft by leaning as can be done with a motorcycle.

It is, therefore, a principal object of this invention to provide a small watercraft which can be ridden like a motorcycle and in which the operator may lean the watercraft for handling or other purposes.

It is a further object of this invention to provide a small watercraft of the type that can be ridden like a motorcycle and which can be leaned by the rider.

Although it is desirable to permit the rider to lean the watercraft for maneuvering or other purposes, if the hull is designed so as to facilitate this operation, then the hull also may be prone to capsize quite easily. In fact, many watercraft are designed so that this can happen and the hull is self righting. However, for an inexperienced or certain types of riders it is desirable to insure that the hull will not capsize even though it may be leaned.

It is, therefore, a still further object of this invention to provide an improved hull construction for a small watercraft which permits the hull to be leaned but which will resist capsizing.

As has been noted, many of the small watercraft and particularly those designed primarily or solely for sporting use, are intended to be operated by only a single rider. However, the utility and enjoyment of the watercraft can be expanded if the rider has the capability of carrying one or more passengers. However, when this is done the sporting nature of the watercraft may be lost. Furthermore, it is desirable to permit the rider and or his passengers to assume different postures on the watercraft for different purposes. For example, it may be desirable to permit both occupants to be seated for long distance cruising and/or one or both of the occupants to operate in a standing position. However, the hull construction should be such so as to permit the occupants of the watercraft to easily move from one position or posture to another without losing their footing.

It is, therefore, a still further object of this invention to provide an improved hull configuration for a small watercraft that permits the rider to accommodate an additional passenger and which also permits the rider or passenger to assume different postures on the watercraft safely and while the watercraft is in motion.

SUMMARY OF THE INVENTION

A first feature of this invention is adapted to be embodied in a watercraft having a hull defining a deck area with a seat supported on the deck area at a substantial distance there above for accommodating for a rider seated thereon in straddle fashion with the rider's knees being bent but in a generally standing posture. Control means are provided for the watercraft forwardly of the seat and accessible by a rider on the seat.

Another feature of the invention is adapted to be embodied in a hull for a small watercraft which facilitates leaning of the hull like a motorcycle when turning and which will resist capsizing. The hull has a pair of widely spaced gunnels that extend along its outer side for providing buoyancy and for limiting the amount of leaning. A pair of generally downwardly converging side sections each extend from a respective gunnel to a lower hull area. The lower hull area has a generally flat portion which is substantially narrower in width than the gunnels.

Yet another feature of the invention is adapted to be embodied in the deck configuration for the hull of a small watercraft. The desk has a seat disposed generally centrally thereon and extending along a portion of the length. On opposite sides of the seat there are provided foot areas which extend rearwardly and there is unincumbered transversely extending foot area disposed in a rear deck positioned behind the seat which has a length that is greater than the width of the individual side foot areas. The side foot areas have an upwardly inclined rear portion that merges into the rear deck.

DETAILED DESCRIPTION OF THE PREFERRED EMBODIMENT OF THE INVENTION

Figure 1:
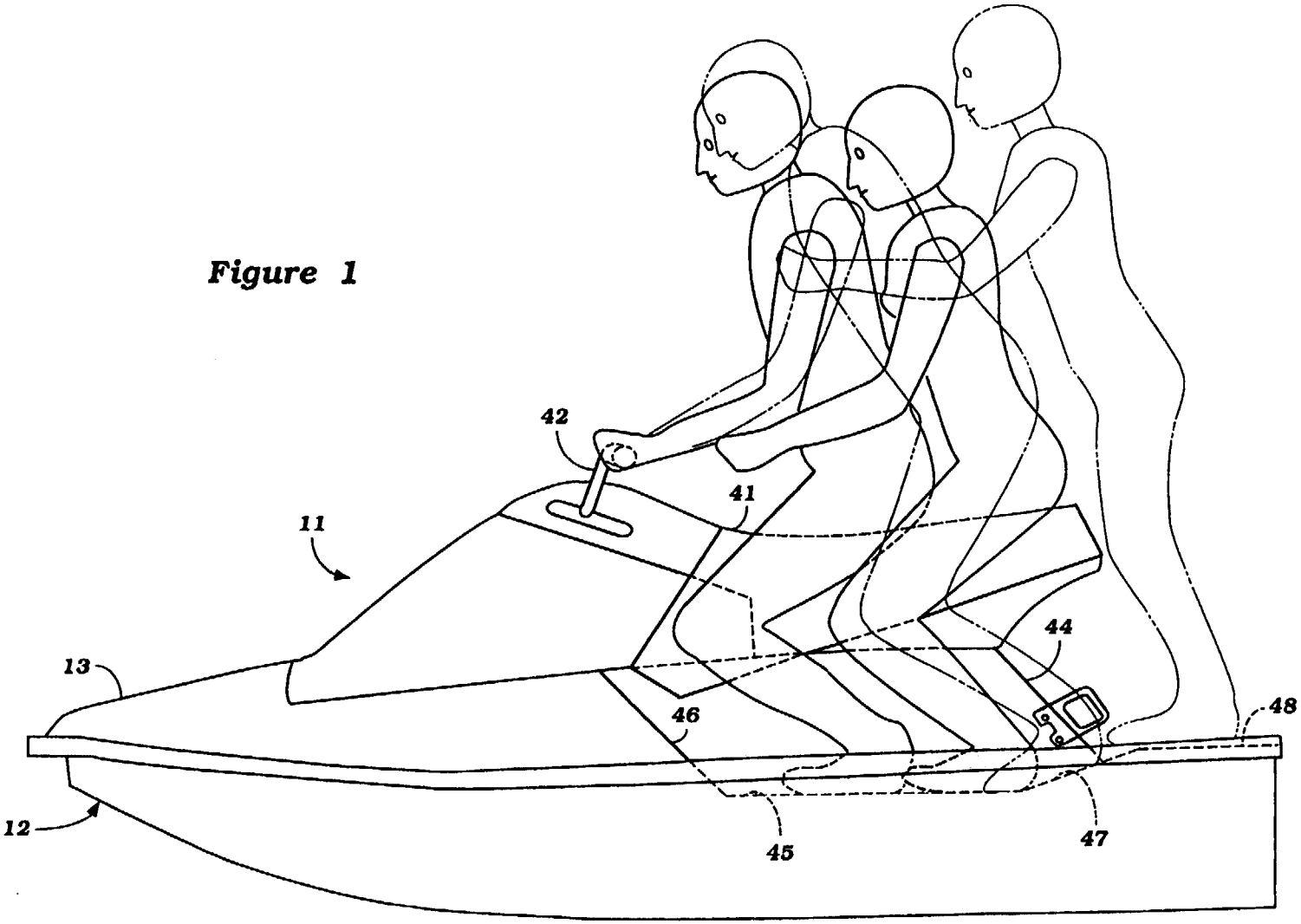
FIG. 1 is a side elevational view of a small watercraft constructed in accordance with an embodiment of the invention and showing the driver and a single passenger both seated and standing in solid and phantom lines, respectively.
Figure 2:
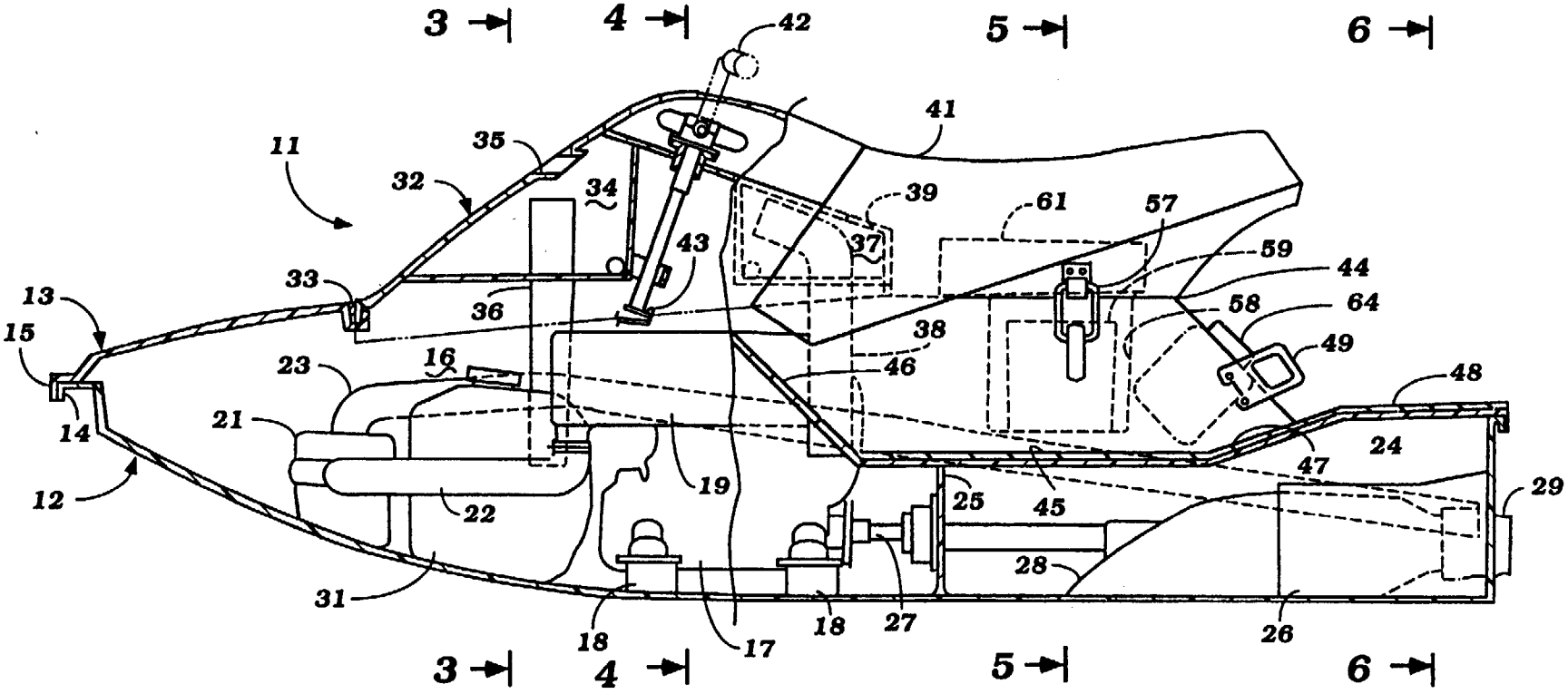
FIG. 2 is a side elevational view of the watercraft, with portions broken away so as to more clearly show the construction.
Figure 3:
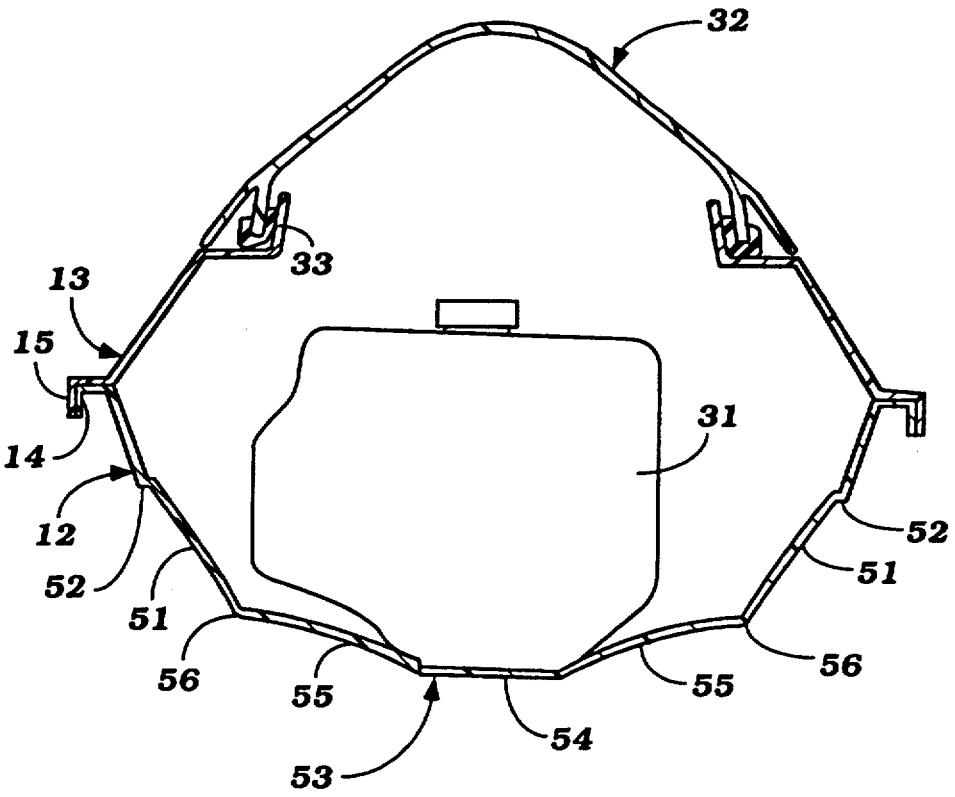
FIG. 3 is a cross sectional view taken along the line 3—3 of FIG. 2.
Figure 4:
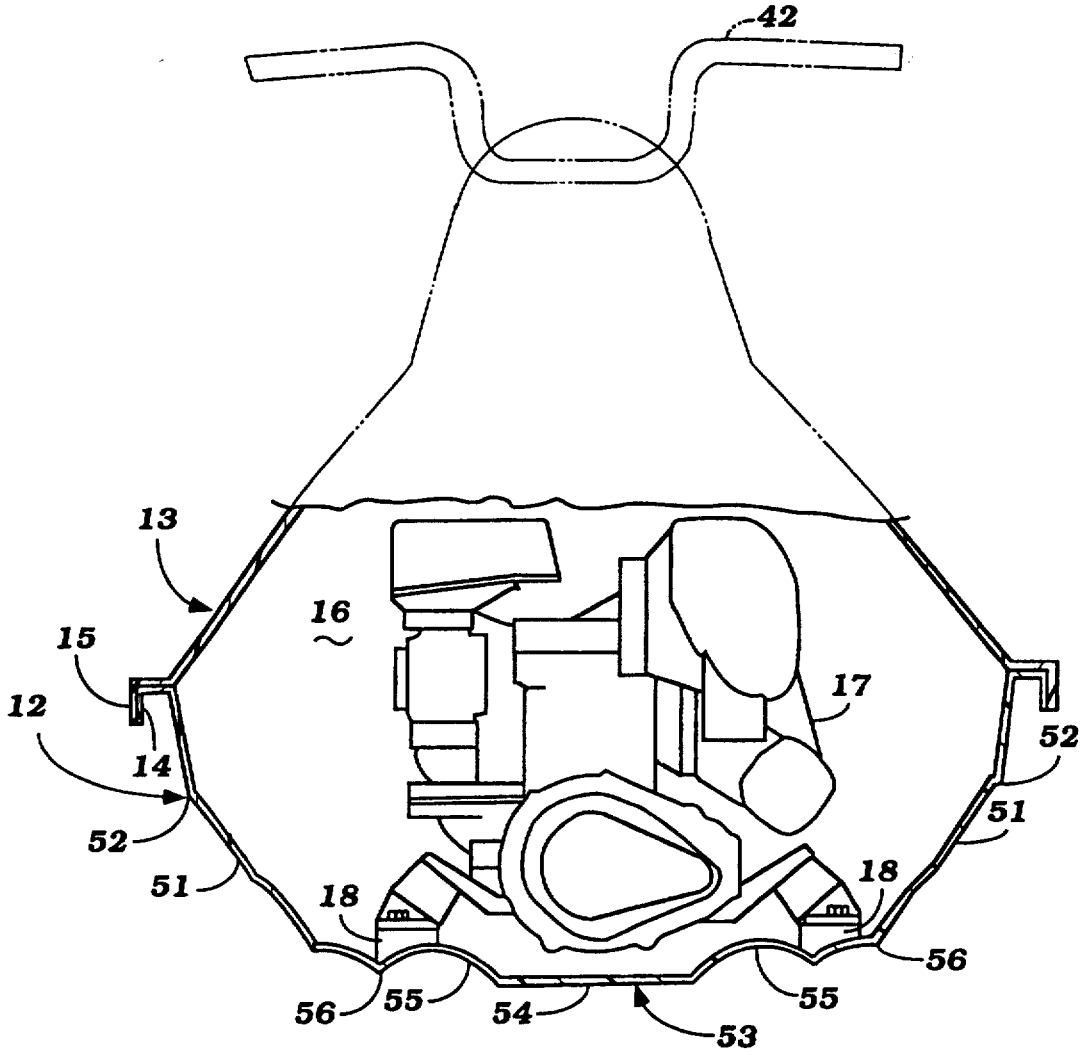
FIG. 4 is a cross sectional view taken along the line 4—4 of FIG. 2.

Referring now in detail to the drawings, the reference numeral 11 designates a small watercraft constructed in accordance with an embodiment of the invention. The watercraft 11 is comprised of a hull assembly made up of a lower hull portion 12 and an upper deck portion 13. The hull portion 12 and deck portion 13 are formed from a suitable material such as a molded fiberglass reinforced resinous plastic or the like. The hull and deck portions 12 and 13 have interlocking flanges 14 and 15, respectively, which extend outwardly and define a gunnel extending around the outer periphery of the watercraft as clearly shown in the figures.

An engine compartment, indicated generally by the reference numeral 16 is formed centrally of and at the forward position of the hull and specifically primarily by the lower hull portion 12. An internal combustion engine 17 of any known type is mounted within the engine compartment 16 on engine mounts 18.

The engine 17, although it may be of any known type, has an exhaust manifold 19 which receives exhaust gases from the engine 17 and also water from its cooling jacket. The exhaust manifold 19 communicates with a water trap and silencing device 21 that is positioned forwardly within the engine compartment through an exhaust pipe 22. The water trap and silencing portion 21 has a discharge exhaust tail pipe 23 that extends rearwardly and which terminates within a tunnel 24 formed rearwardly of the engine compartment 16 and which is defined by a vertically extending bulkhead 25.

A jet propulsion unit, indicated generally by the reference numeral 26 is positioned within the tunnel 24 rearwardly of the bulkhead 25. An output shaft 27 of the engine 17 extends through the bulkhead 25 and is coupled to an impeller shaft of the jet propulsion unit 26 for drawing water through a downwardly facing water inlet portion 28 and discharging it through a pivotal steering nozzle 29 in a well known manner.

A fuel tank 31 for the engine 17 is positioned forwardly of the engine 17 and between the engine 17 and the water trap and silencing device 21. The fuel tank 31, water trap and silencing device 21 and engine 17 are disposed so that their masses will lie substantially on a longitudinally extending center plane of the watercraft 11 for balance purposes. Further details of the construction of the engine 17 and its ancillary components and the jet propulsion unit 26 is not believed to be necessary to enable those skilled in the art to practice the invention. For that reason, further details of the construction and operation of these components is not believed to be necessary.

The engine 17 and fuel tank 31 are accessible through a removable hatch cover 32 which engages a peripheral seal 33 carried by the deck portion 13 so as to provide a water tight seal. An air inlet cavity 34 is formed by the hatch cover 32 and atmospheric air can enter this cavity 34 through an atmospheric air inlet 35. A vertically extending vent pipe 36 extends downwardly from the cavity 34 into the engine compartment 16 so as to provide ventilating air to the engine compartment 16 and also air for induction into the engine 17 for its operation.

An exhaust air cavity 37 is also formed by the hatch cover 32 rearwardly of the inlet cavity 34. An L shaped ventilating air exhaust pipe 38 is disposed near the rear of the engine 17 and extends into the exhaust cavity 37. An exhaust air outlet 39 is formed in the upper portion of the cavity 37 and communicates with an area now to be described.

The area is enclosed by a seat 41 that is affixed to the deck portion 13 rearwardly of the hatch cover 32 and which may partially overlie the hatch cover 32. The seat 41 is formed from a suitable cushioning and slip resistent material and has its seating surface configured so that a driver and passenger may sit upon the seat as shown in FIG. 1 in a somewhat straddle fashion much like on a motorcycle. When so seated, the driver and passenger, as shown in FIG. 1 in solid lines, have their knees in a bent position similar to that of a rider of a motorcycle so that they are in a semi-standing posture. The seat is inclined upwardly in a rearward direction to provide a higher seating position progressing toward the rear of the watercraft 11. This permits the rearwardly position rider to see over the driver's shoulders and also permits the driver to increase his heighth or move to a standing position by moving rearwardly along the seat 41.

The seat and specifically its slip resistent material extends down along the sides and forwardly so that the rider and passengers may grip the seat with their knees so as to afford stability.

A handle bar assembly 42 is positioned forwardly of the seat 41 and on substantially the same height as it so that the forward most rider may operate a steering mechanism for steering the discharge nozzle 29 in a known manner, which includes a flexible transmitter having a connection to a lever arm 43 fixed to the lower end of the handlebar 42. Other controls such as throttle control, engine kill switch, etc may be positioned forwardly of the seat 41 in proximity to or on the handlebar assembly 42.

Figure 5:
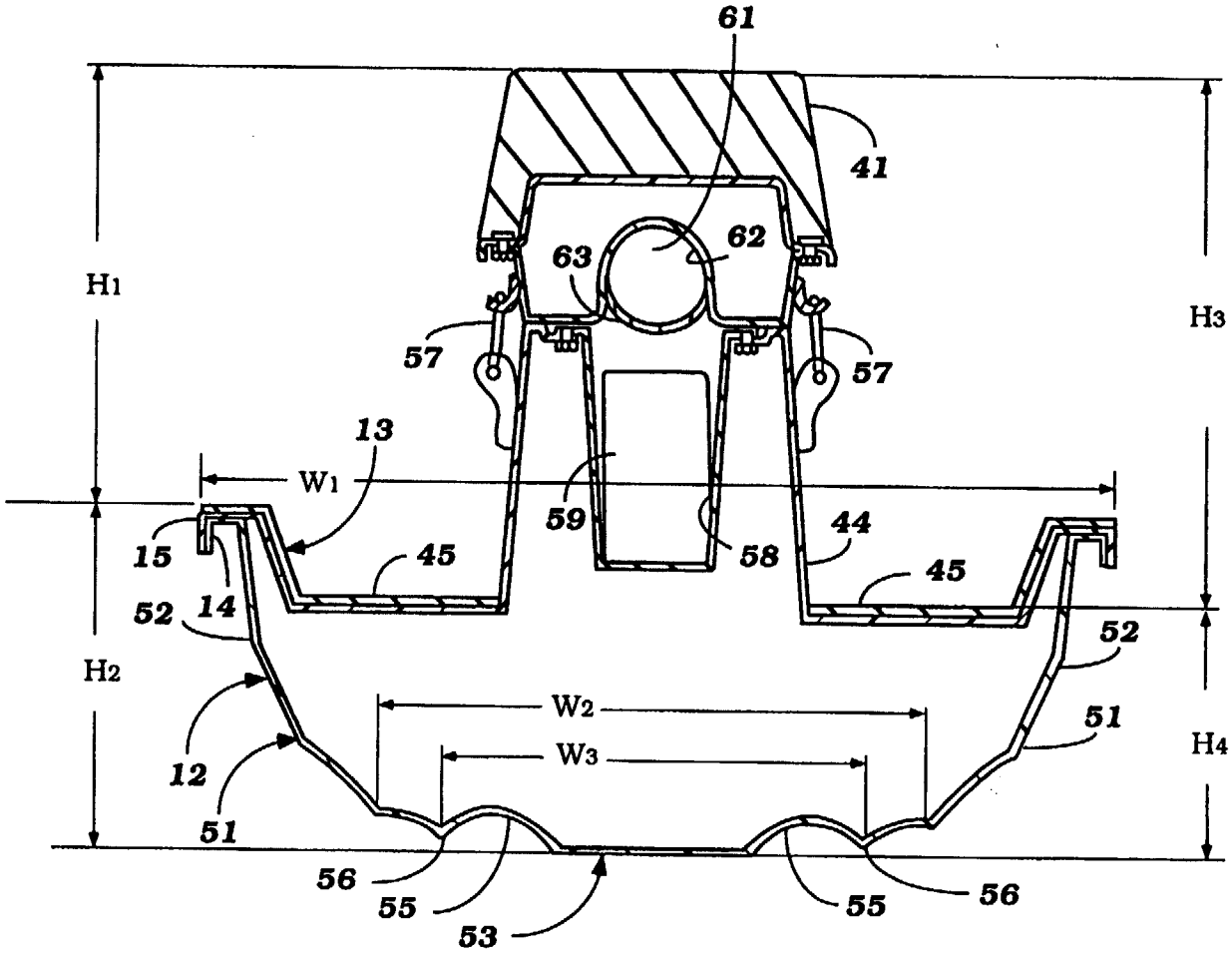
FIG. 5 is a cross sectional view taken along the line 5—5 of FIG. 2.
Figure 6:
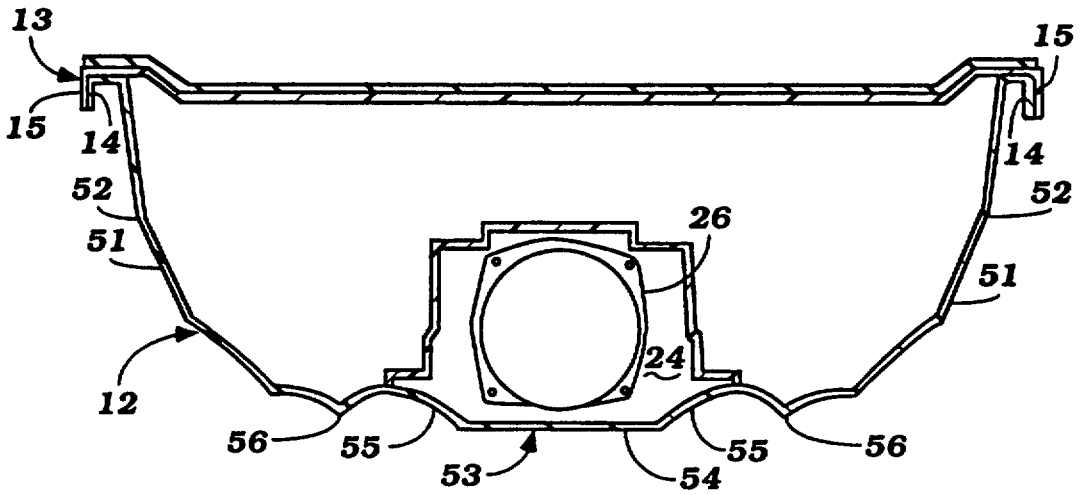
FIG. 6 is a cross sectional view taken along the line 6—6 of FIG. 2.
Figure 7:
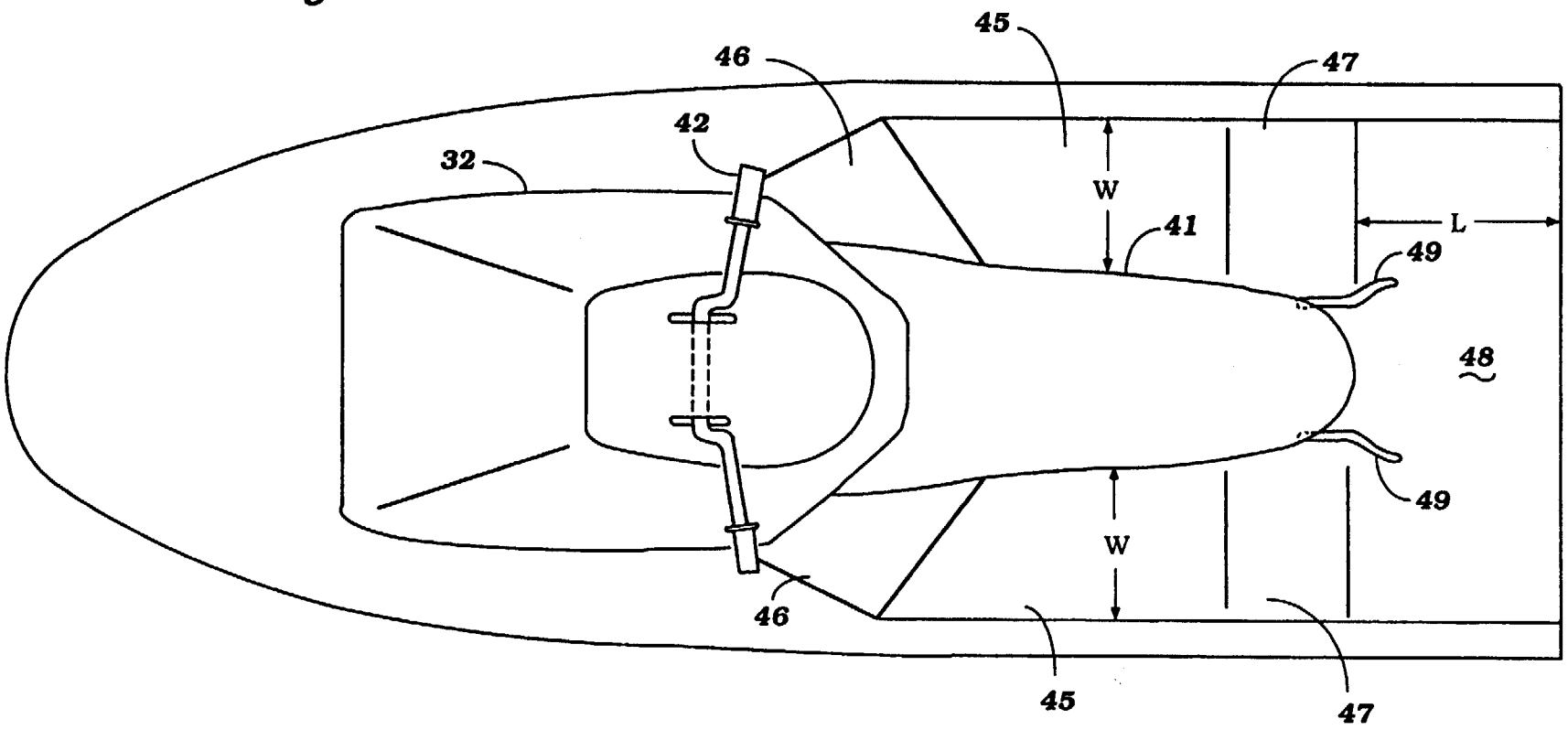
FIG. 7 is a top plan view of the watercraft.

The seat 41 is supported on a raised pedestal 44 of the deck portion which is surrounded by a pair of depressed foot areas 45 as best seen in FIGS. 5 and 7 which foot areas may be covered with a slip resistent material such as a textured rubber or the like. Forwardly of the foot areas 45 there are provided upwardly inclined portions 46 on which a rider may position his feet if desired. It should be noted that the foot areas 45 are tapered slightly upwardly toward an area contiguous to the rear end of the seat 41.

There is then provided a more steeply inclined ramp area 47 that offers an area where a rider may brace his feet if he desires to assume such a riding position. Rearwardly of these areas 47, there is provided a transversely extending rear deck portion 48 which has a length L that is at least equal to and preferably greater than the width W of the foot areas 45 and which is also covered by a slip resistent material.

It will be noted that the underside of the rear portion of the seat 41 tapers abruptly in a forward direction. In a like manner, the rear edge of the pedestal 44 tapers abruptly in a forward direction so as to afford a greater foot area for standing at the rear of the watercraft 11 on the rear deck portion 48.

As may be seen in FIG. 1, this permits the passenger to assume a full standing position to the rear of the driver if the driver slides rearwardly on the seat 41 to a rearwardly position location where the driver places his feet against the ramp portion 47. This deck configuration not only provides good footing for the driver and his passenger but also permits the rider and/or passengers to conveniently shift their position on the watercraft so as to assume the desired position, even though the watercraft 11 is in motion. When standing on the deck 48 it will be noted that the rider's feet actually can extend partially beneath the rear portion of the seat 41 due to the forward taper of the underside of the seat and the rear of the pedestal 44 which clearly appear in FIG. 1.

A rider may easily enter the watercraft 11 from the rear since the deck area 48 is opened at the rear and is not defined by an upstanding transom, as with more conventional types of watercraft. A pair of hand grips 49 are provided on the rear portion of the pedestal 44 and on opposite sides thereof to permit the passengers to easily grip the handles 49 and enter the watercraft from a body of water in which the watercraft is operating.

In addition to being able to sit on the watercraft 11 and specifically its seat 41 like a motorcycle, both the driver and passenger may lean the watercraft like a motorcycle to facilitate turning or the like. To this end, the hull portion 12 is formed in such a way as to offer good buoyancy but never the less permit some leaning without capsizing.

As has been previously noted, the gunnels formed by the interlocking flanges 14 and 15 are disposed at a substantial outboard width and will contact the water to prevent capsizing. However, there are a pair of tapered downwardly converging side sections 51 that are formed adjacent the flanges 14 and which have chines 52 formed at their midsection so as to offer some resistance upon extreme leaning. The side sections 51 then merge into a lower section 53 which is generally plainer but which is comprised of a flat center part 54 and a pair of curved side parts 55 which merge into the lower portion of the sides 51. This point of merger also forms chines 56 that lend to the stability of the watercraft and which maintain directional control while still permitting the leaning operation as aforenoted.

The proportioning of the hull, as aforenoted, is particularly important in permitting leaning of the watercraft 11 like a motorcycle while, at the same time, avoiding capsizing of the watercraft. Typical dimensions are shown for a preferred embodiment of the watercraft in relation to FIG. 5 by the following chart:

| | |
|---|---|
| $W_1:W_2 =$ | 880:540 |
| $H_1:H_2 =$ | 380:300 |
| $H_2:W_1 =$ | 300:880 |
| $(H_1 + H_2):W_1 =$ | 680:880 |
| $H_4:H_3 =$ | 230:450 |
| $W_1:W_3 =$ | 880:410 |

The dimensions in the above chart are given in centimeters. Of course, these dimensions will change at other cross sections, but the proportions in so far as the width ratios will hold true along the substantial length of the watercraft although the actual dimensions will be different. The same holds true with respect to the heighth relationships.

It should be noted that the seat 41 is removable and is detachably retained to the pedestal 44 by means of a pair of latches 57. A battery compartment 58 that receives a storage battery 59 is positioned centrally of the pedestal 44 beneath the seat 41. In addition, a fire extinguisher 61 may be carried in a cylindrical recess 62 of the seat 41 and held in place by an elastic strap 63. A glove box 64 is also formed rearwardly of the pedestal 44 in the area between the handles 49.

In addition to the fact that the raised or high elevation of the seat 41 permits the riders to be seated in a semistanding position, the relatively great heighth of the seat 41 above the main portion of the hull gives rise to a large buoyant area disposed above the deck 45. Even though the gunnels 14 and 15 tend to resist capsizing, in the event the watercraft does become capsized, this high buoyant area provided by the seat 41 and the hollow area beneath it will add to the buoyancy of the watercraft and easily permit a displaced rider to right the watercraft if it does become capsized. In addition, this heighth of the buoyant area provided by the seat 41 and the raised pedestal 44 will insure that the watercraft cannot become completely inverted.

It should be readily apparent from the foregoing description that the described watercraft easily accommodates a rider and one or more passengers and in such a way that the rider and/or passengers may lean the watercraft like a motorcycle and ride the craft like a motorcycle without fear of capsizing. In addition, the rider and/or passengers may conveniently move their positions to the desired riding posture while the watercraft is in motion without fear of slipping due to the described foot area. Of course, the foregoing description is that of a preferred embodiment of the invention and various changes and modifications may be made without departing from the spirit and scope of the invention, as defined by the appended claims.

We claim:

1. A hull for a small watercraft which facilitates leaning of the hull like a motorcycle when turning and which resists capsizing, said hull having a pair of widely spaced gunnels extending along its outer sides, a seat positioned between said gunnels and of a height to accommodate a rider in a partially standing posture, a pair of transversely spaced apart foot areas on opposite sides of said seat to accommodate the feet of a rider, a pair of generally downwardly converging side sections each extending from a respective gunnel to a lower hull area, the lower ends of said side sections being spaced apart a width substantially narrower in width than at said gunnels and disposed below the centers of said foot areas, said lower hull area being comprised of a flat central area and a pair of curved side portions connected at one side to said flat central area by a respective chine and connected at the other sides to said side sections, said side sections each being formed with a further chine spaced transversely outwardly from said foot areas and adjacent the respective of said gunnels and substantially above said lower ends.

2. A hull for a small watercraft as set forth in claim 1 further including a rear deck area to the rear of the seat and sized for accommodating a rider standing thereon.

3. A hull for a small watercraft as set forth in claim 2 wherein the foot areas on the side of the seat extend generally in a horizontal direction and are connected to the rear deck area by upwardly inclined sections against which a rider may brace his feet.

4. A hull for a small watercraft as set forth in claim 2 further including a pair of grab handles disposed on opposite sides of the seat and wherein the rear deck area is open so that a rider may enter the watercraft from a body of water in which the watercraft is positioned from the rear.

5. A hull for a small watercraft as set forth in claim 4 wherein the foot areas on the side of the seat extend generally in a horizontal direction and are connected to the rear deck area by upwardly inclined sections against which a rider may brace his feet.

* * * * *